(12) United States Patent  (10) Patent No.: US 9,122,329 B2
Maekawa  (45) Date of Patent: Sep. 1, 2015

(54) IMAGE DISPLAYING APPARATUS, IMAGE CONTROLLING APPARATUS, IMAGE FORMING APPARATUS, IMAGE CONTROLLING METHOD, AND COMPUTER-READABLE MEDIUM

(71) Applicant: FUJI XEROX CO., LTD., Minato-ku, Tokyo (JP)

(72) Inventor: Takao Maekawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 281 days.

(21) Appl. No.: 13/667,482

(22) Filed: Nov. 2, 2012

(65) Prior Publication Data

US 2013/0314446 A1 Nov. 28, 2013

(30) Foreign Application Priority Data

May 25, 2012 (JP) .................................. 2012-119853

(51) Int. Cl.
G09G 5/34 (2006.01)
G06F 3/041 (2006.01)
(52) U.S. Cl.
CPC ........ *G06F 3/041* (2013.01); *G09G 5/34* (2013.01); *G09G 2354/00* (2013.01)
(58) Field of Classification Search
None
See application file for complete search history.

(56) References Cited

U.S. PATENT DOCUMENTS 6,252,594 B1 * 6/2001 Xia et al. .................. 715/786
2012/0032979 A1 * 2/2012 Blow et al. .............. 345/647

FOREIGN PATENT DOCUMENTS

JP 2006-085210 A 3/2006

* cited by examiner

*Primary Examiner* — Xiao Wu
*Assistant Examiner* — Steven Elbinger
(74) *Attorney, Agent, or Firm* — Sughrue Mion, PLLC

(57) ABSTRACT

An image displaying apparatus includes an image display that displays an image, and a controller that determines an image and controls the image display to display the determined image. The image display includes a display that displays all or part of information content as a whole image or a partial image in a predetermined area, and when displaying the partial image, additionally displays a positional image indicating where the partial image is positioned within the whole image, and a position detector that detects the position where a contacting object contacts the display. The controller includes a scroll determining unit that determines whether or not to scroll the displayed partial image according to change in the detected position, and a positional image determining unit that determines where to display the positional image according to the detected position.

9 Claims, 10 Drawing Sheets

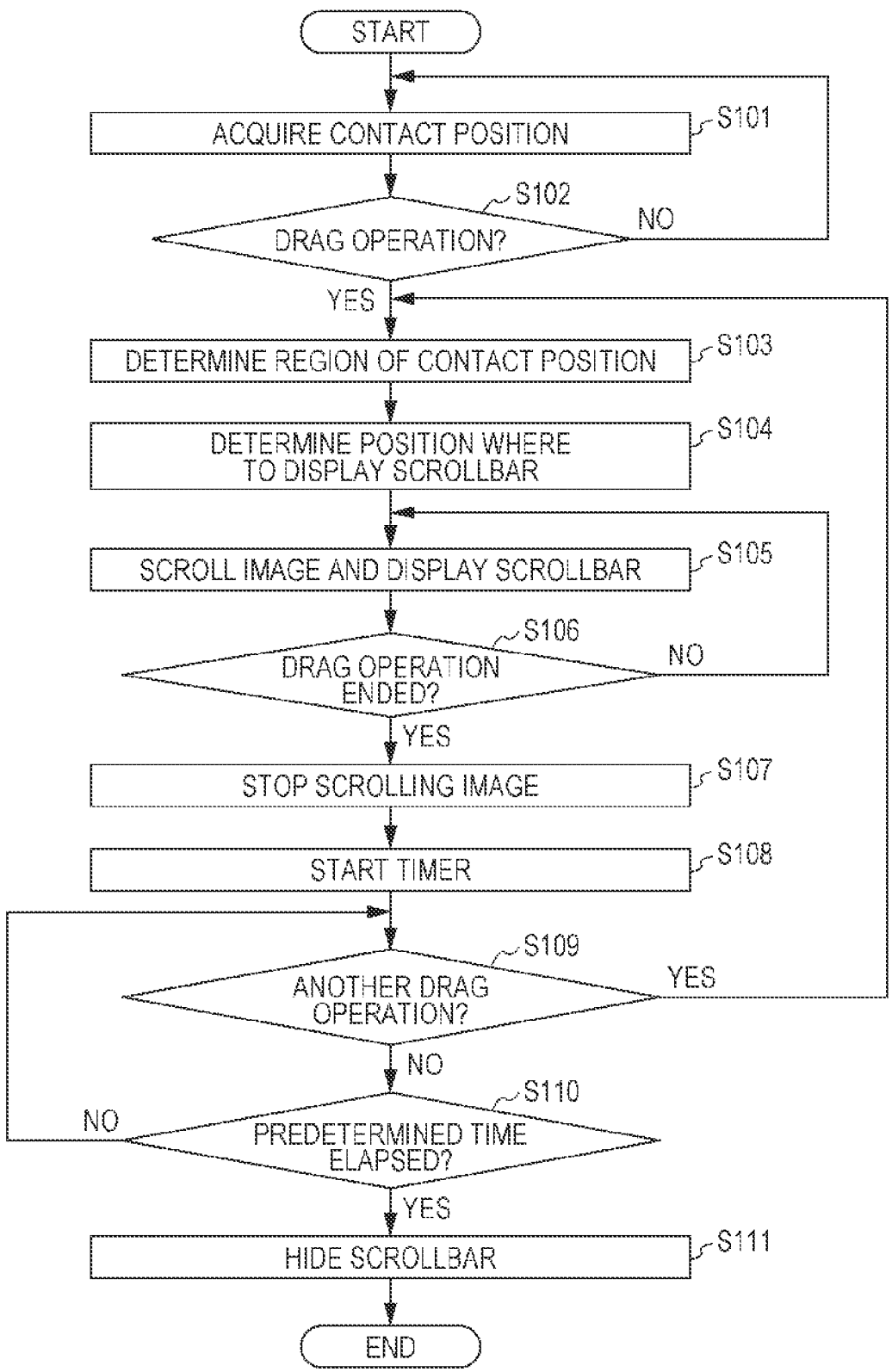

IMAGE DISPLAYING APPARATUS, IMAGE CONTROLLING APPARATUS, IMAGE FORMING APPARATUS, IMAGE CONTROLLING METHOD, AND COMPUTER-READABLE MEDIUM

CROSS-REFERENCE TO RELATED APPLICATIONS

This application is based on and claims priority under 35 USC 119 from Japanese Patent Application No. 2012-119853 filed May 25, 2012.

BACKGROUND

Technical Field

The present invention relates to an image displaying apparatus, an image controlling apparatus, an image forming apparatus, an image controlling method, and a computer-readable medium.

SUMMARY

According to an aspect of the invention, there is provided an image displaying apparatus including an image display that displays an image, and a controller that determines an image to be displayed by the image display and controls display of the determined image. The image display includes a display that displays all or part of information content as a whole image or a partial image in a predetermined area, and when displaying the partial image, additionally displays a positional image indicating where the partial image is positioned within the whole image, and a position detector that detects a position where a contacting object contacts the display. The controller includes a scroll determining unit that determines whether or not to scroll a partial image being displayed on the display according to change in the position detected by the position detector in the case where the whole image of the information content does not entirely fit on the display and the partial image is being displayed on the display, and a positional image determining unit that determines a position where the positional image is to be displayed on the display according to the position detected by the position detector in the case where the scroll determining unit has determined to scroll the partial image.

BRIEF DESCRIPTION OF THE DRAWINGS

Exemplary embodiments of the present invention will be described in detail based on the following figures, wherein:

FIG. 6 is a flowchart illustrating operation of a controller;

DETAILED DESCRIPTION

First Exemplary Embodiment

Hereinafter, exemplary embodiments of the invention will be described in detail and with reference to the attached drawings. First, a detailed configuration and operation of the first exemplary embodiment will be described.

Figure 1:
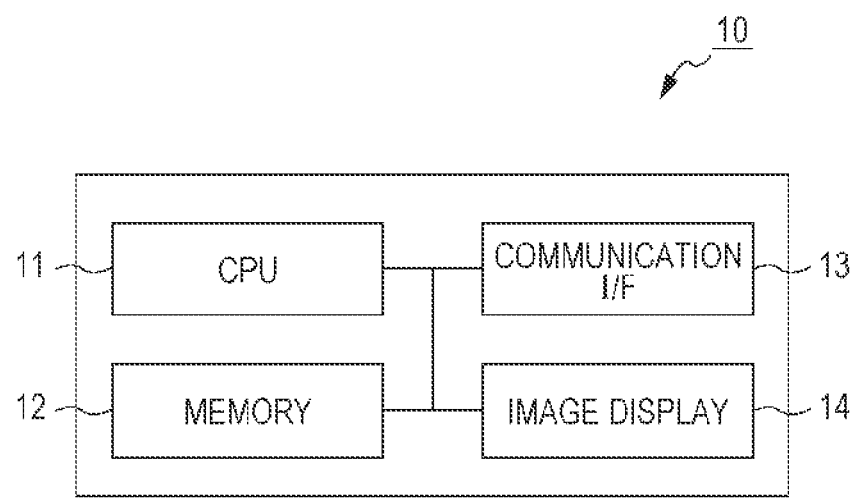
FIG. 1 illustrates a hardware configuration of an image displaying apparatus according to an exemplary embodiment.

FIG. 1 illustrates a hardware configuration of an image displaying apparatus according to an exemplary embodiment.

An image displaying apparatus 10 according to the exemplary embodiment is a computer, examples of which include smartphones, tablets, mobile phones, and personal computers (PCs).

As illustrated in FIG. 1, the image displaying apparatus 10 includes a central processing unit (CPU) 11, and memory 12 for storage. The CPU 11 executes various software, such as an operating system (OS) and applications. The memory 12 is a storage area that stores various software and data used in the execution thereof, for example. In addition, the image displaying apparatus 10 includes a communication interface (hereinafter designated the "communication I/F") 13 for communicating with external apparatus, and an image display 14 that displays images. The image displaying apparatus 10 may further include additional storage such as a hard disk drive (HDD) and flash memory. The HDD and flash memory may store input data and output data that is input into or output from various software. The image displaying apparatus 10 may also include input devices such as a keyboard and mouse. Note that the CPU 11 and the memory 12 may also be taken to be a controller that determines an image to be displayed by the image display 14, and controls display of the determined image.

Figure 2:
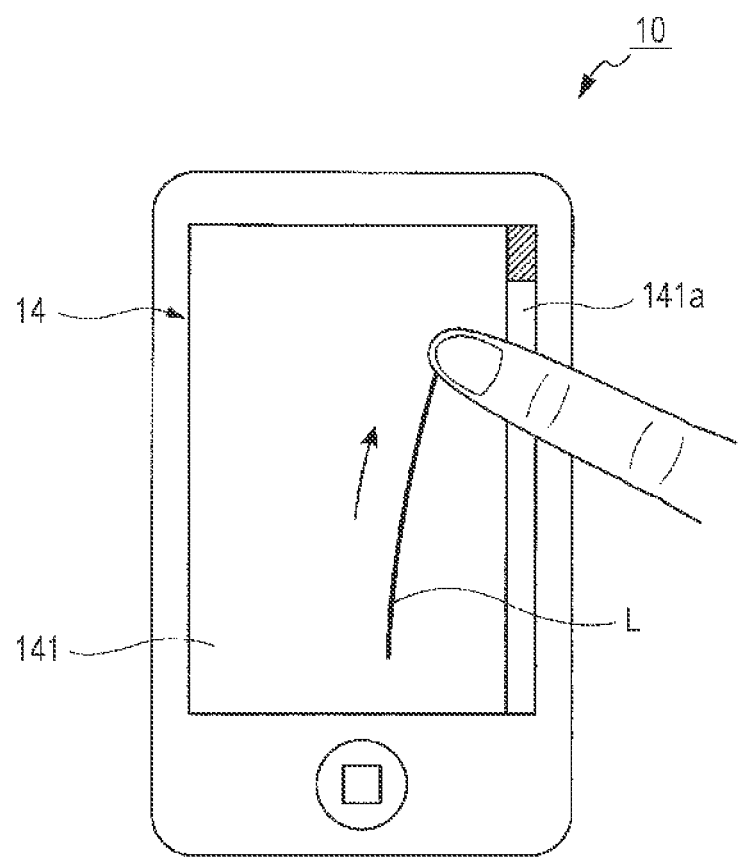
FIG. 2 illustrates an image display.

FIG. 2 illustrates the image display 14.

The image displaying apparatus 10 given as an example herein is a smartphone. Additionally, a touch panel is implemented as the image display 14. Therefore, the image display 14 includes an LCD panel 141 as well as a position detector (not illustrated). The LCD panel 141 is an example of a display unit that displays content (i.e., information content) as an image in a predetermined area. When a contacting object such as a person's finger or a stylus contacts the LCD panel 141, the position detector detects the position where the contacting object contacts the LCD panel 141. The touch panel used as LCD panel 141 in this exemplary embodiment is not particularly limited, and various touch panels such as resistive and capacitive touch panels may be used.

When an image displaying apparatus 10 with this configuration displays a preview image, a list, or other such content image on the LCD panel 141, in some cases the entire content image may not fit on the display unit. In such cases, a partial image may be displayed on the LCD panel 141. Furthermore, when the user operating the image displaying apparatus 10 desires to view a part of the image that is not being displayed on the LCD panel 141, a method is typically conducted in which the user scrolls the image being displayed on the LCD panel 141 according to a predetermined method, thereby causing a different part of the image to be displayed.

With an image displaying apparatus 10 such as the smartphone illustrated in FIG. 2, scrolling an image is often performed by causing a contacting object such as a person's finger or stylus to contact the LCD panel 141, and then moving the contacting object in the desired scroll direction while maintaining contact. In other words, an image being displayed on the LCD panel 141 is scrolled if the user drags a contacting object over the LCD panel 141. Herein, the contacting object is dragged upward as illustrated in FIG. 2 in the case where the user desires to scroll the image upward and display a part of the image below that currently being displayed on the LCD panel 141. In FIG. 2, a person's finger is illustrated as the contacting object, and the path made when dragging the finger over the LCD panel 141 is illustrated and denoted by the path L.

Conversely, the contacting object is dragged downward in the case where the user desires to scroll the image downward and display a part of the image above that currently being displayed on the LCD panel 141. Furthermore, in some cases the user may desire to scroll an image leftward or rightward and display a part of the image to the left or right of that currently being displayed on the LCD panel 141. In such cases, the user may drag a contacting object leftward or rightward over the LCD panel 141, respectively, similarly to the case of dragging upward or downward.

In addition, a scrollbar 141a is often displayed at this point as a positional image indicating where the image being displayed on the LCD panel 141 is positioned among the content. By displaying such scrollbar 141a, the user operating the image displaying apparatus 10 is able to determine at a glance where the image being displayed on the LCD panel 141 is positioned among the content. Moreover, it is typical for the scrollbar 141a to not only function as such an indicator, but also to function as a button for scrolling an image displayed on the LCD panel 141 upward or downward. Displaying the scrollbar 141a on the LCD panel 141 in this way increases convenience for the user operating the image displaying apparatus 10.

However, when the scrollbar 141a is displayed on the LCD panel 141 of an image displaying apparatus 10 with a display area of limited size, particularly devices such as smartphones and mobile phones, the scrollbar 141a may be obscured by the person's finger or other contacting object, as illustrated in FIG. 2. In this case, checking the scrollbar 141a may involve moving the finger outside the display area of the LCD panel 141.

However, as described hereinafter, the controller that controls display of an image on the LCD panel 141 in the present exemplary embodiment also controls change of the position where the scrollbar 141a is displayed, depending on the position where a contacting object contacts the LCD panel 141.

Figure 3:
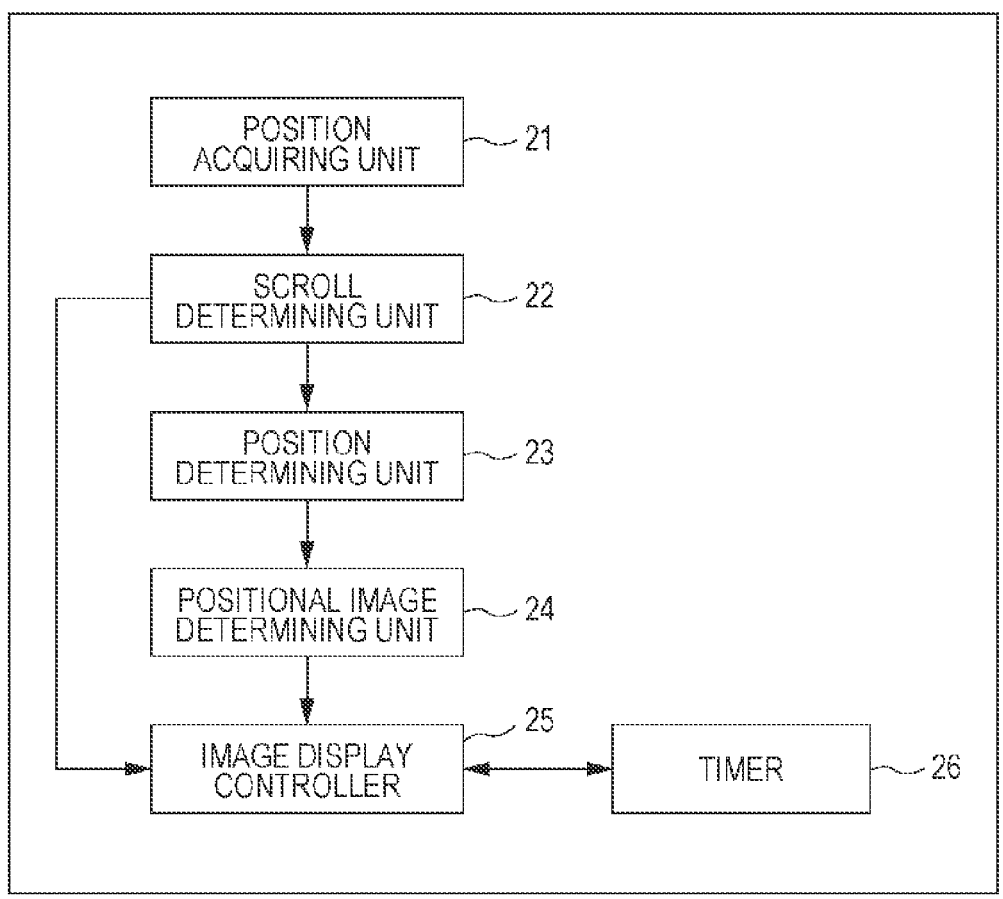
FIG. 3 illustrates an exemplary functional configuration of a controller according to an exemplary embodiment.

FIG. 3 illustrates an exemplary functional configuration of a controller according to the exemplary embodiment.

As illustrated in FIG. 3, a controller according to the exemplary embodiment includes a position acquiring unit 21, a scroll determining unit 22, a position determining unit 23, a positional image determining unit 24, an image display controller 25, and a timer 26.

When a contacting object such as a person's finger contacts the LCD panel 141 (see FIG. 2), the position acquiring unit 21 acquires the position where the contacting object contacts the LCD panel 141. In other words, the image display 14 is a touch panel as discussed earlier, and includes a position detector that detects the position where a contacting object contacts the LCD panel 141. Thus, the position acquiring unit 21 is able to acquire the position where the contacting object contacts the LCD panel 141 from the position detector.

In the case where a content image does not entirely fit on the LCD panel 141 and a partial image is being displayed on the LCD panel 141, the scroll determining unit 22 determines whether or not to scroll the image displayed on the LCD panel 141 according to change in position acquired by the position acquiring unit 21 (i.e., the position detected by the position detector). In other words, the scroll determining unit 22 determines whether or not an operation performed on the LCD panel 141 by a contacting object is a drag operation. Additionally, in the case where the user has performed a drag operation, the scroll determining unit 22 determines whether the position where the contacting object contacts the LCD panel 141 has moved upward or downward, and determines whether to scroll the image upward or downward.

In the case where the scroll determining unit 22 has determined to scroll the image upward or downward, the position determining unit 23 determines whether the position on the LCD panel 141 acquired by the position acquiring unit 21 belongs to a region to the left or a region to the right of a predetermined virtual line that divides the LCD panel 141 into left and right sides.

Figure 4:
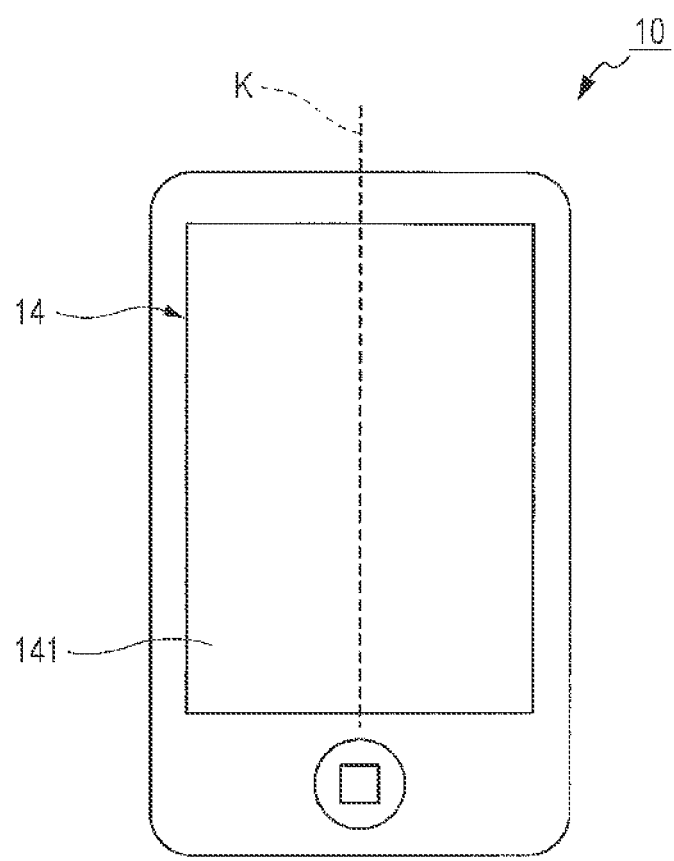
FIG. 4 illustrates a virtual line.

FIG. 4 illustrates a virtual line.

The virtual line K illustrated in FIG. 4 is a virtual boundary line that divides the LCD panel 141 into left and right sides. The position determining unit 23 determines whether the position where the contacting object contacts the LCD panel 141 is in the region to the left or the region to the right of this virtual line K. Although in FIG. 4 the virtual line K is set as a vertical or nearly vertical line positioned at or near the center of the LCD panel 141, the virtual line K is not limited thereto, and is not particularly limited insofar as the virtual line K divides the LCD panel 141 into left and right sides while in a state where the user is using the image display 14. For example, the virtual line K may also be placed with an offset to the left or to the right from the center of the LCD panel 141, and may also cut across the LCD panel 141 in a diagonal direction. The virtual line K may also be a curve.

From the result determined by the position determining unit 23, the positional image determining unit 24 determines the position where the scrollbar 141a is to be displayed on the LCD panel 141. Stated differently, in the case where the scroll determining unit 22 has determined to scroll the image, the positional image determining unit 24 determines the position where the scrollbar 141a is to be displayed on the LCD panel 141 according to the position detected by the position detector.

In this exemplary embodiment, the positional image determining unit 24 determines that the scrollbar 141a is to be displayed on the right edge of the LCD panel 141 in the case where the position detected by the position detector is in the region to the left of the virtual line K. Conversely, the positional image determining unit 24 determines that the scrollbar 141a is to be displayed on the left edge of the LCD panel 141 in the case where the position detected by the position detector is in the region to the right of the virtual line K.

The image display controller 25 then displays both the content image and the scrollbar 141a on the LCD panel 141.

Although discussed in detail later, the timer 26 measures the amount of time since the end of a drag operation performed by the user. If a predetermined amount of time elapses, the image display controller 25 hides the scrollbar 141a.

Figure 5A:
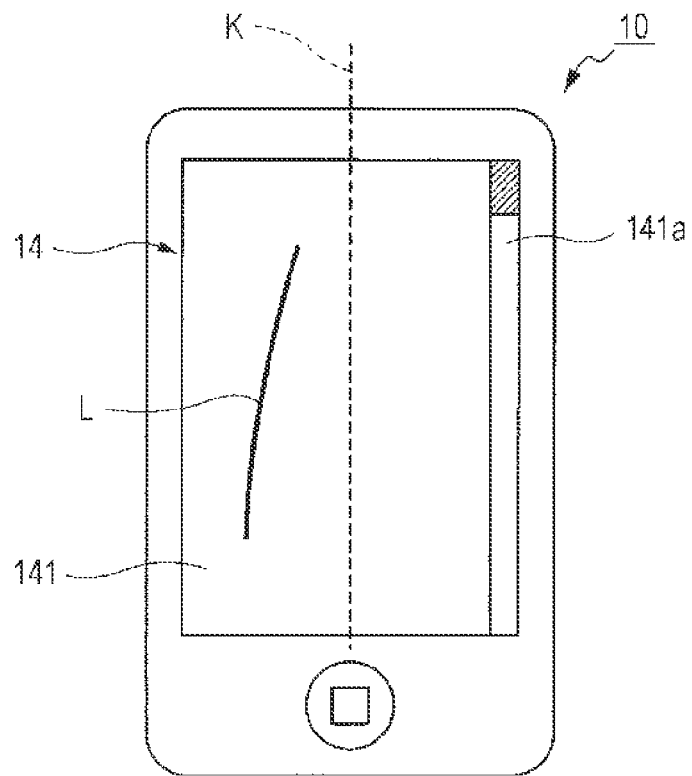
FIGS. 5A and 5B illustrate positions where a scrollbar may be displayed.
Figure 5B:
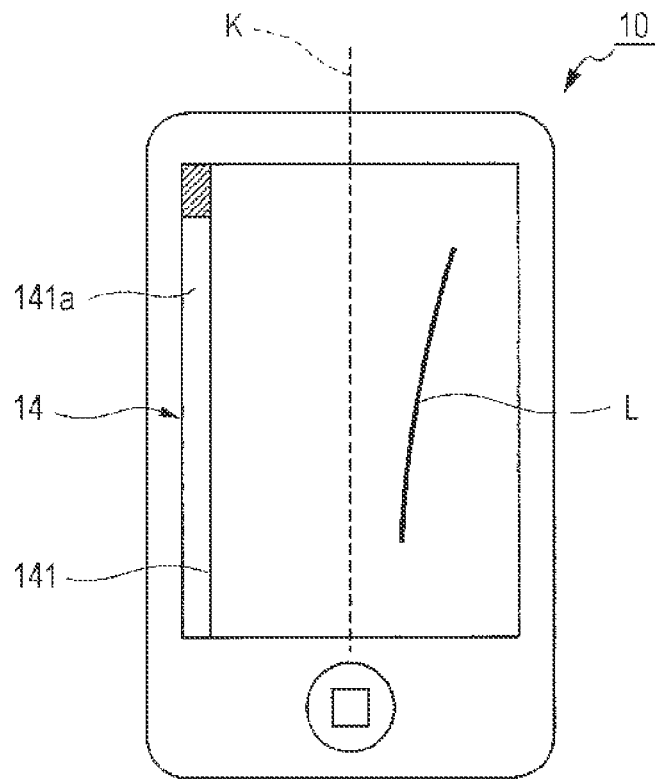

FIGS. 5A and 5B illustrate positions where the scrollbar 141a may be displayed as a result of the above described control of the controller.

FIG. 5A illustrates the position where the scrollbar 141a is displayed in the case where the result determined by the position determining unit 23 indicates the region to the left of the virtual line K. As illustrated in FIG. 5A, the scrollbar 141*a* is displayed on the right edge of the LCD panel 141.

Meanwhile, FIG. 5B illustrates the position where the scrollbar 141*a* is displayed in the case where the result determined by the position determining unit 23 indicates the region to the right of the virtual line K. As illustrated in FIG. 5B, the scrollbar 141*a* is displayed on the left edge of the LCD panel 141.

FIG. 6 is a flowchart illustrating operation of the controller.

Hereinafter, FIGS. 5A, 5B, and 6 will be used to describe operation of the controller. Note that conducting the following process is premised upon the assumption that a vertically scrollable image is already being displayed on the LCD panel 141.

First, if a person's finger or other contacting object contacts the LCD panel 141 of the image display 14, the contact position is detected by the position detector of the image display 14. Subsequently, the position acquiring unit 21 acquires this contact position from the position detector (step 101).

Next, the scroll determining unit 22 determines whether or not the operation performed on the LCD panel 141 by the contacting object is a drag operation (step 102). In this exemplary embodiment, if the scroll determining unit 22 determines that the operation is a drag operation (step 102, Yes), the operation is determined to be an operation by which the user scrolls the image upward or downward. It is also determined from the direction of the drag operation whether the user desires to scroll the image upward or downward. However, if the scroll determining unit 22 determines that the operation is not a drag operation (step 102, No), the process returns to step 101.

Next, the position determining unit 23 determines whether the contact position belongs to the region to the left or the region to the right of the virtual line K (step 103).

Additionally, from the result determined by the position determining unit 23, the positional image determining unit 24 determines the position where the scrollbar 141*a* is to be displayed on the LCD panel 141 (step 104). As discussed earlier, at this point the positional image determining unit 24 determines that the scrollbar 141*a* is to be displayed on the right edge of the LCD panel 141 in the case where the result determined by the position determining unit 23 indicates the region to the left of the virtual line K. Conversely, the positional image determining unit 24 determines that the scrollbar 141*a* is to be displayed on the left edge of the LCD panel 141 in the case where the result determined by the position determining unit 23 indicates the region to the right of the virtual line K.

The image display controller 25 then displays the content image and the scrollbar 141*a* on the LCD panel 141 (step 105). At this point, the scrollbar 141*a* is displayed at the position determined by the positional image determining unit 24. The image display controller 25 also scrolls the image displayed on the LCD panel 141 in the user-desired direction. At this point the scrollbar 141*a* may be semi-transparent, for example, to allow the user to see through to the image being scrolled. Doing so may improve image visibility for the user.

Next, the scroll determining unit 22 determines whether or not the drag operation performed by the user has ended (step 106).

In the case where the drag operation performed by the user has not ended (step 106, No), the process returns to step 105 and the image display controller 25 continues to display the scrollbar 141*a* while scrolling the image in the user-desired direction.

In contrast, in the case where the drag operation performed by the user has ended (step 106, Yes), the image display controller 25 stops scrolling the image (step 107). Also, at this point the timer 26 starts measuring the amount of time elapsing (step 108).

Meanwhile, the scroll determining unit 22 determines whether or not the user has again performed a drag operation (step 109), and the process returns to step 103 in the case where a drag operation is performed (step 109, Yes).

In the case where a drag operation is not being performed (step 109, No), the timer 26 determines whether or not a predetermined amount of time has elapsed (step 110).

At this point, the process returns to step 109 in the case where the predetermined amount of time has not yet elapsed (step 110, No).

Conversely, in the case where the predetermined amount of time elapses (step 110, Yes), the image display controller 25 hides the scrollbar 141*a* (step 111). In other words, in this exemplary embodiment, a process is conducted such that the scrollbar 141*a* is displayed starting from the time at which the scroll determining unit 22 determines that an image is to be scrolled upward or downward, and the display of the scrollbar 141*a* ends after a predetermined amount of time elapsing since the time at which the scroll determining unit 22 determines that the processing to scroll the image upward or downward has ended. In so doing, the surface area used to display an image may be increased when the user is not performing an operation to scroll the image upward or downward.

As described above, in this exemplary embodiment, the position of the scrollbar 141*a* is changed depending on the position where a contacting object contacts the LCD panel 141. As a result, the scrollbar 141*a* is displayed at a position that is distanced from the position where the contacting object contacts the LCD panel 141. For this reason, the scrollbar 141*a* is less likely to be obscured by the contacting object, and the user is able to see the scrollbar 141*a* more easily.

Herein, the path L made over the LCD panel 141 when performing a drag operation is a line segment. Stated differently, the positions successively detected by the position detector together form a line segment. For this reason, in some cases the position on the LCD panel 141 where the user is performing a drag operation may switch between the region to the left and the region to the right of the virtual line K. For example, in some cases a drag operation may be initiated in the region to the left of the virtual line K and cross over to the region to the right of the virtual line K during the operation, such that the end position of the drag operation is in the region to the right of the virtual line K.

In this case, it may be configured such that the positional image determining unit 24 determines the display position of the scrollbar 141*a* according to the start position from among the positions detected by the position detector, and does not change the display position of the scrollbar 141*a* even if the region changes. However, it may also be configured such that the positional image determining unit 24 changes the position where the scrollbar 141*a* is displayed on the LCD panel 141 when the position detected by the position detector moves between the region to the left and the region to the right of the virtual line K. In this case, if the position where the user performs a drag operation changes from the left side to the right side of the virtual line K, the display position of the scrollbar 141*a* is changed from the right edge to the left edge of the LCD panel 141. Conversely, if the position where the user performs a drag operation changes from the right side to the left side of the virtual line K, the display position of the scrollbar 141*a* is changed from the left edge to the right edge of the LCD panel 141.

If the latter technique of changing the display position of the scrollbar 141a during a drag operation is implemented, the likelihood of a contacting object obscuring the scrollbar 141a may be further reduced. However, since the scrollbar 141a moves during scrolling, this technique may confuse the user in some cases. If the former technique of not changing the display position of the scrollbar 141a during a drag operation is implemented, the user is not confused, because the scrollbar 141a does not move during scrolling. Consequently, it is also conceivable to implement a method that selects one of the above techniques depending on factors such as the image to display and the usage of the image displaying apparatus 10.

Also, in the example described above, the scrollbar 141a is displayed after the scroll determining unit 22 determines that an operation performed on the LCD panel 141 by a contacting object is a drag operation. However, the configuration is not limited thereto, and the scrollbar 141a may also be displayed in advance. In this case, the scrollbar 141a may be displayed in advance on the right edge of the LCD panel 141, for example. Then, when a drag operation is subsequently performed by the user, the scrollbar 141a is displayed on the left edge or the right edge according to the result determined by the position determining unit 23.

Figure 7:
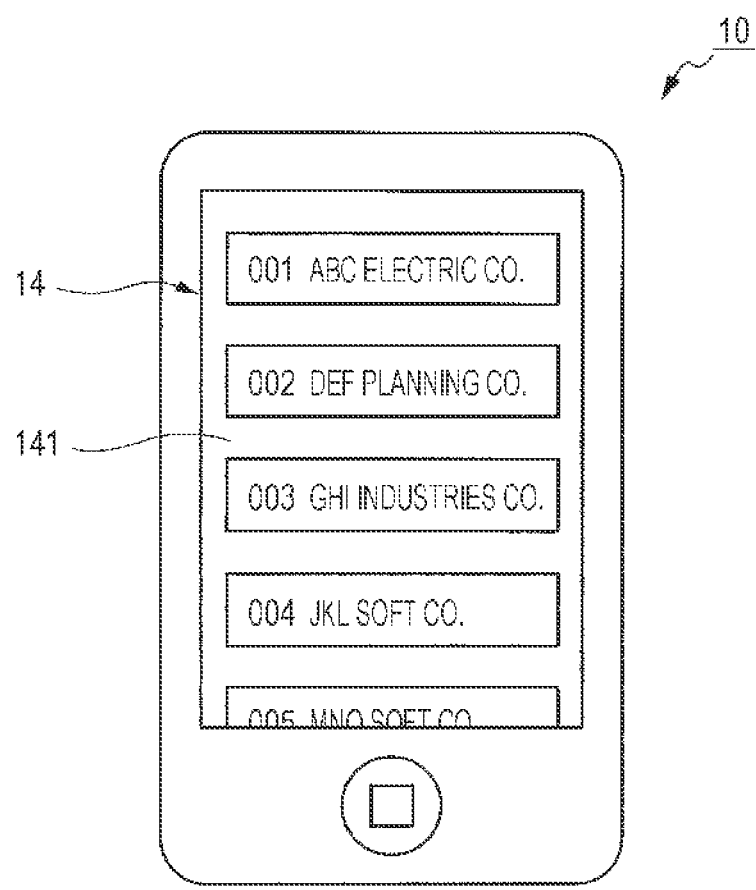
FIG. 7 illustrates an image being displayed on a liquid crystal display (LCD) panel.

Also, an image being displayed on the LCD panel 141 may also be displayed such that its lowermost portion is partially displayed, as illustrated by way of example in FIG. 7. In this case, it is possible to indicate to the user that the image is scrollable, even if the scrollbar 141a is not displayed.

Furthermore, although in the example described above the scrollbar 141a is displayed on the opposite side of a virtual line K set on the LCD panel 141 with respect to the region where contact is made by a contacting object, the scrollbar 141a may also be displayed on the same side as the region of contact. In other words, in this case, the positional image determining unit 24 determines that the scrollbar 141a is to be displayed on the left edge of the LCD panel 141 in the case where the result determined by the position determining unit 23 indicates the region to the left of the virtual line K. Conversely, the positional image determining unit 24 determines that the scrollbar 141a is to be displayed on the right edge of the LCD panel 141 in the case where the result determined by the position determining unit 23 indicates the region to the right of the virtual line K.

As a result, the scrollbar 141a is displayed near the position where a contacting object contacts the LCD panel 141. In so doing, it becomes easier to operate the button for scrolling inside the scrollbar 141a, and thus is effective in cases where a user-desired image may be more quickly displayed by operating the button. For example, consider the case where a list from an address book is displayed on the LCD panel 141 as the content, and the user knows the general whereabouts of his or her desired image within the list. In such a case, the user is able to more rapidly display an image at the desired position by operating the button inside the scrollbar 141a.

In the example described above, a drag operation is given as an example of a user operation for scrolling an image being displayed on the LCD panel 141. However, the user operation is not limited thereto, and may also be another operation, such as a flick operation.

Note that the controller in the configuration illustrated in FIG. 3 may also be considered to be an image controlling apparatus. In this case, the controller in FIG. 3 may be taken to be an image controlling apparatus including a position acquiring unit configured to acquire the position where a contacting object contacts an LCD panel 141 that displays all or part of content as a whole image or a partial image in a predetermined area, and when displaying the partial image, additionally displays a scrollbar 141a indicating where the partial image is positioned within the whole image, a scroll determining unit configured to determine whether or not to scroll a partial image displayed on the LCD panel 141 according to change in position acquired by the position acquiring unit in the case where the whole image of the content does not entirely fit on the LCD panel 141 and the partial image is being displayed on the LCD panel 141, a positional image determining unit configured to determine the position where the scrollbar 141a is to be displayed on the LCD panel 141 according to the position acquired by the position acquiring unit in the case where the scroll determining unit has determined to scroll the partial image, and an image display controller configured to display both the partial image of the content and the scrollbar 141a on the LCD panel 141.

Furthermore, the processing conducted by the controller in FIG. 3 may be realized by the cooperative action of software and hardware resources. For example, such processing may be realized as a result of the CPU 11 loading a program that realizes the respective functions of the controller illustrated in FIG. 3 into the memory 12, and then executing the program.

Accordingly, the program may be taken to be a program that causes a computer to realize functions that include acquiring the position where a contacting object contacts an LCD panel 141 that displays all or part of content as a whole image or a partial image in a predetermined area, and when displaying the partial image, additionally displays a scrollbar 141a indicating where the partial image is positioned within the whole image, determining whether or not to scroll a partial image displayed on the LCD panel 141 according to change in the acquired position in the case where the whole image of the content does not entirely fit on the LCD panel 141 and the partial image is being displayed on the LCD panel 141, determining the position where the scrollbar 141a is to be displayed on the LCD panel 141 according to the acquired position in the case where it is determined to scroll the partial image, and displaying both the partial image of the content and the scrollbar 141a on the LCD panel 141.

Second Exemplary Embodiment

Although the foregoing example describes the case of scrolling an image upward or downward, an exemplary embodiment is not limited thereto, and it is also possible to apply an exemplary embodiment to the case of scrolling an image leftward or rightward.

Figure 8:
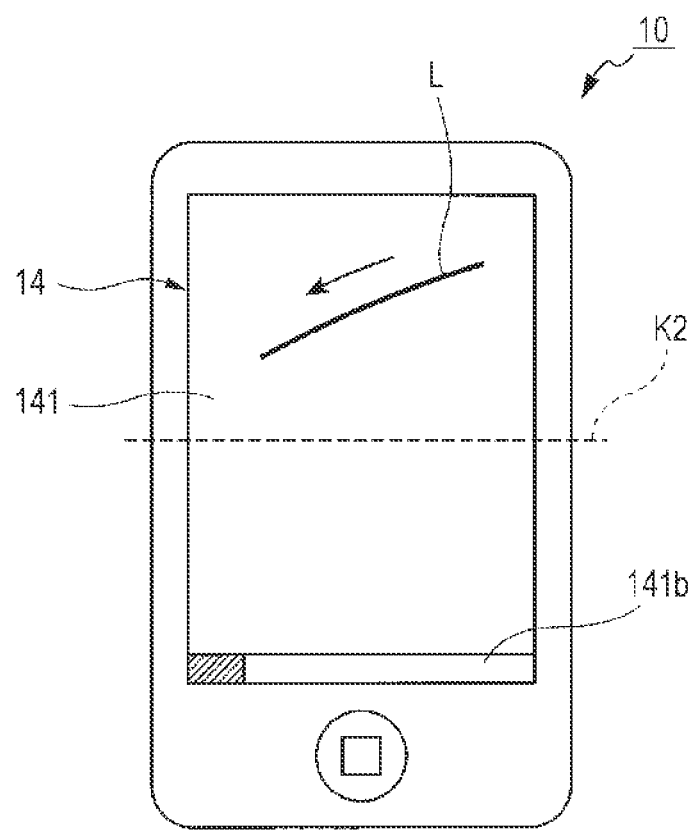
FIG. 8 illustrates a scrollbar in the case of scrolling an image leftward or rightward.

FIG. 8 illustrates a scrollbar 141b in the case of scrolling an image leftward or rightward.

In the example illustrated in FIG. 8, the position where a contacting object contacts the LCD panel 141 is determined to belong to a region above or a region below a second virtual line K2 that divides the LCD panel 141 into top and bottom parts. Depending on the determined result, the position where to display the scrollbar 141b on the LCD panel 141 is determined. Herein, the scrollbar 141b is an example of a positional image that indicates where a partial image being displayed on the LCD panel 141 is positioned within the whole image in the left and right directions. For example, the scrollbar 141b may be displayed on the bottom edge of the LCD panel 141 in the case where the determined result indicates the region above the second virtual line K2. Conversely, the scrollbar 141b may be displayed on the top edge of the LCD panel 141 in the case where the determined result indicates the region below the second virtual line K2.

Such processing may be similarly realized by a controller in accordance with the exemplary functional configuration illustrated in FIG. 3. In this case, the scroll determining unit 22 in FIG. 3 determines whether or not to scroll an image displayed on the LCD panel 141 leftward or rightward according to change in the position detected by the position detector of the image display 14. The position determining unit 23 then determines whether the position detected by the position detector of the image display 14 belongs to the region above or the region below the predetermined second virtual line K2 that divides the LCD panel 141 into top and bottom parts. Additionally, in the case where the scroll determining unit 22 determines to scroll the image leftward or rightward, the positional image determining unit 24 determines the position where the scrollbar 141b is to be displayed on the LCD panel 141 according to the position detected by the position detector. Herein, the scrollbar 141b indicates where the image being displayed on the LCD panel 141 is positioned among the content in the left and right directions.

Obviously, it may also be configured such that both the scrollbar 141a and the scrollbar 141b are used.

Third Exemplary Embodiment

In the foregoing examples, a predetermined virtual line K or second virtual line K2 is set on the LCD panel 141, and the position of the scrollbar 141a or 141b is determined according to whether or not a contacting object contacts the area to the left or the right of the virtual line K, or above or below the second virtual line K2. However, a configuration is not limited thereto.

Figure 9A:
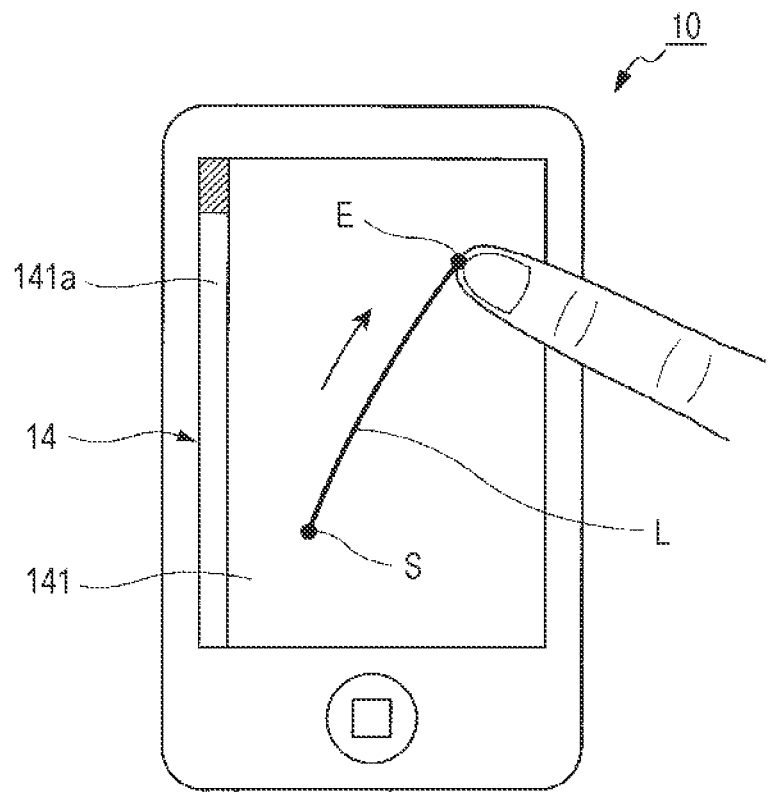
FIGS. 9A and 9B illustrate another example of determining the position where a scrollbar is to be displayed on an LCD panel.
Figure 9B:
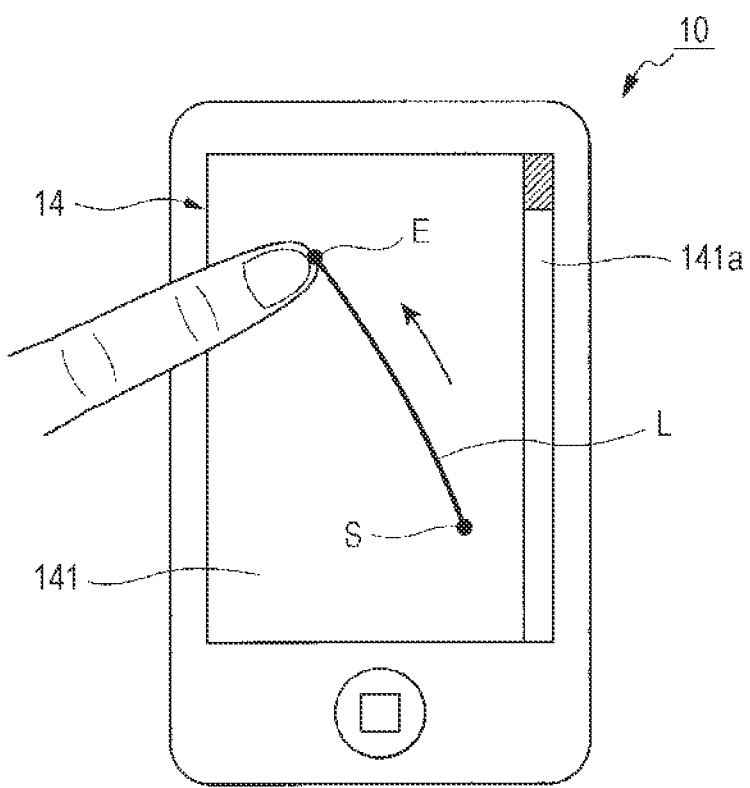

FIGS. 9A and 9B illustrate another example of determining the position where the scrollbar 141a is to be displayed on the LCD panel 141.

If the user performs a drag operation on the LCD panel 141 as discussed earlier, its path L forms a line segment. In this exemplary embodiment, the display position of the scrollbar 141a is determined according to the slope of this line segment.

More specifically, consider the case where the user performs a drag operation on the LCD panel 141 with his or her finger or a stylus. In this case, if the user uses his or her right hand, the path L tends to be sloped diagonally up and to the right (i.e., down and to the left), as illustrated in FIG. 9A. Conversely, if the user uses his or her left hand, the path L tends to be sloped diagonally up and to the left (i.e., down and to the right), as illustrated in FIG. 9B.

Note that the paths L illustrated in FIGS. 9A and 9B are similar for both the case where the user performs a drag operation from top to bottom as well as the case from bottom to top.

In this exemplary embodiment, it is determined that the user has used his or her right hand when the path L made when the user performs a drag operation on the LCD panel 141 is sloped diagonally up and to the right. In this case, the display position of the scrollbar 141a is determined to be on the left edge of the LCD panel 141.

Conversely, it is determined that the user has used his or her left hand when the path L made when the user performs a drag operation on the LCD panel 141 is sloped diagonally up and to the left. In this case, the display position of the scrollbar 141a is determined to be on the right edge of the LCD panel 141.

In so doing, the scrollbar 141a is less likely to be obscured by the contacting object, and the user is able to see the scrollbar 141a more easily.

Whether the path L is sloped diagonally up and to the right or diagonally up and to the left may be determined from the positions of the start point S and the end point E when a drag operation is performed, for example.

Such processing may be similarly realized by a controller in accordance with the exemplary functional configuration illustrated in FIG. 3. In this case, the position determining unit 23 in FIG. 3 determines whether the path L is sloped diagonally up and to the right or diagonally up and to the left according to positions detected by the position detector of the image display 14. For example, the position determining unit 23 may make a determination from the position of the start point S and the position of the end point E from among the positions detected by the position detector. Then, in the case where the path L is sloped up and to the right, the positional image determining unit 24 determines that the scrollbar 141a is to be displayed on the left edge of the LCD panel 141. Conversely, in the case where the path L is sloped up and to the left, the positional image determining unit 24 determines that the scrollbar 141a is to be displayed on the right edge of the LCD panel 141. Stated differently, the positional image determining unit 24 determines that the scrollbar 141a is to be displayed on the left edge of the LCD panel 141 in the case where the position detected by the position detector of the image display 14 moves along a path L sloped diagonally up and to the right, and determines that the scrollbar 141a is to be displayed on the right edge of the LCD panel 141 in the case where the position detected by the position detector of the image display 14 moves along a path L sloped diagonally up and to the left.

Fourth Exemplary Embodiment

Although the image displaying apparatus 10 is described as being a device such as a smartphone in the examples detailed above, it is also possible to apply the foregoing configurations to other apparatus. For example, the foregoing configurations are applicable to an image forming apparatus that forms an image on a recording medium and outputs the result as printed media. Herein, the apparatus used as the image forming apparatus may be an apparatus including printer functions only, or an apparatus including other image processing functions such as scanner functions and facsimile functions in addition to printer functions.

Figure 10:
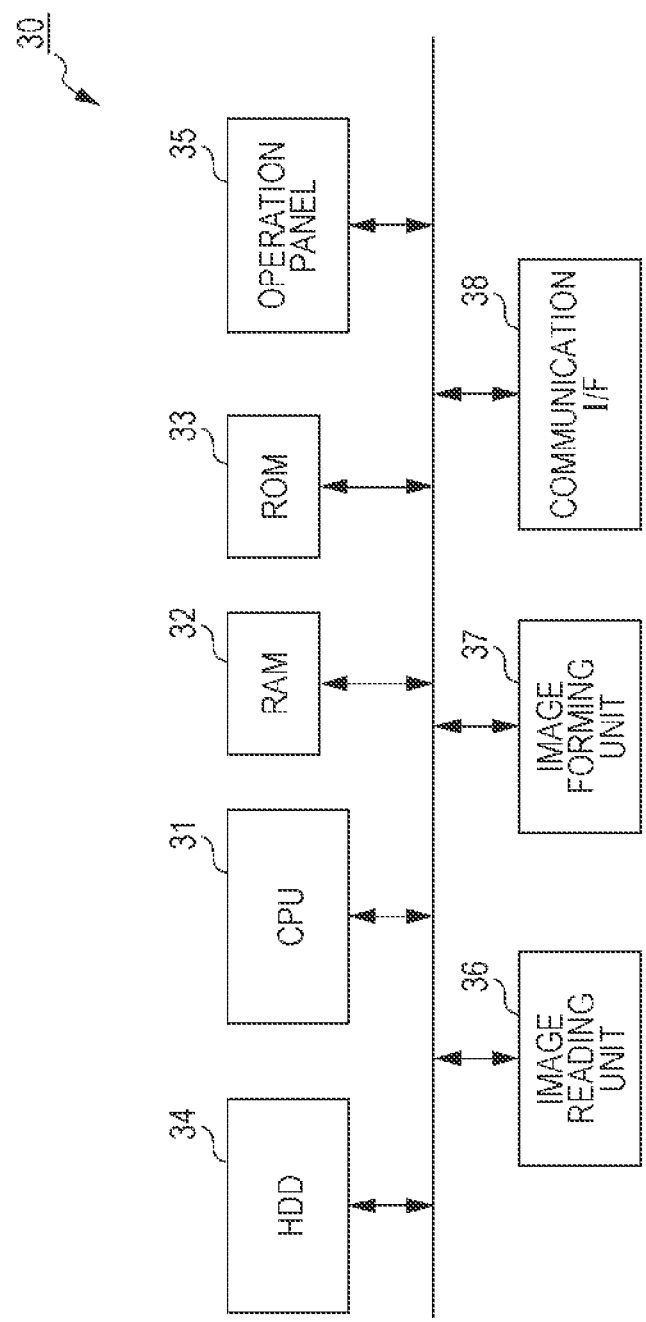
FIG. 10 illustrates an exemplary hardware configuration of an image forming apparatus according to an exemplary embodiment.

FIG. 10 illustrates an exemplary hardware configuration of an image forming apparatus according to the fourth exemplary embodiment.

As illustrated in FIG. 10, the image forming apparatus 30 includes a CPU 31, random access memory (RAM) 32, read-only memory (ROM) 33, a hard disk drive (HDD) 34, an operation panel 35, an image reading unit 36, an image forming unit 37, and a communication interface (hereinafter designated the "communication I/F") 38.

The CPU 31 realizes the respective functions described below by loading various programs stored in the ROM 33 or elsewhere into the RAM 32 and executing the programs.

The RAM 32 is memory used as work memory for the CPU 31, for example.

The ROM 33 is memory that stores information such as the various programs executed by the CPU 31.

The HDD 34 is, for example, a magnetic disk device that stores information such as image data that has been read in by the image reading unit 36 and image data used for image formation in the image forming unit.

The operation panel 35 is a touch panel, for example, and is provided in the fourth exemplary embodiment as an example of an image display that displays information regarding the apparatus.

The image reading unit 36 reads in an image recorded onto a recording medium such as paper. Herein, the image reading unit 36 is a scanner, for example, and may be a charge-coupled device (CCD) scanner in which light from a light source is radiated onto a document and the reflected light therefrom is focused by a lens and sensed by a CCD, or a contact image sensor (CIS) scanner in which light from LED light sources is successively radiated onto a document and the reflected light therefrom is sensed by a CIS.

The image forming unit 37 forms an image onto a recording medium. Herein, the image forming unit 37 is a printer, for example, and may be an electrophotographic system in which an image is formed by causing toner adhering to a photoconductor to be transferred to a recording medium such as a paper sheet, or an inkjet printer in which an image is formed by ejecting ink onto a recording medium. In the fourth exemplary embodiment, the image forming unit 37 is provided as an example of an image forming unit that forms an image onto a recording medium.

The communication I/F 38 transmits and receives various information to and from other apparatus via a network.

Note that the CPU 11 and memory 12 positioned as a controller in the image displaying apparatus 10 correspond to components such as the CPU 31, RAM 32, ROM 33, and HDD 34 in the image forming apparatus 30 according to the fourth exemplary embodiment. Accordingly, such components may be designated a controller in the image forming apparatus 30 according to the fourth exemplary embodiment.

Herein, the configuration of the image displaying apparatus 10 described earlier may be applied to make an image displayed on the operation panel 35 scrollable upward and downward, for example. For example, it is conceivable for a list of print jobs queued in the image forming apparatus 30 to be displayed on the operation panel 35, such that the user selects a desired job for printing from the list. Furthermore, in cases where the image forming apparatus 30 includes facsimile functions, for example, it is conceivable for a list of facsimile destinations to be displayed on the operation panel 35, such that the user selects a desired destination for facsimile transmission from the list.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image displaying apparatus comprising:
    an image display configured to display an image; and
    a controller configured to determine an image to be displayed by the image display, and control display of the determined image;
    wherein the image display includes:
        a display configured to display all or part of information content as a whole image or a partial image in a predetermined area, and when displaying the partial image, additionally display a positional image indicating where the partial image is positioned within the whole image; and
        a position detector configured to detect a position where a contacting object contacts the display,
    the controller includes:
        a scroll determining unit configured to determine whether or not to scroll a partial image being displayed on the display according to change in the position detected by the position detector in the case where the whole image of the information content does not entirely fit on the display and the partial image is being displayed on the display; and
        a positional image determining unit configured to determine a position where the positional image is to be displayed on the display according to the position detected by the position detector in the case where the scroll determining unit has determined to scroll the partial image, determine that the positional image is to be displayed on the left edge of the display in the case where the position detected by the position detector moves along a path sloped diagonally up and to the right on the display, and determine that the positional image is to be displayed on the right edge of the display in the case where the position detected by the position detector moves along a path sloped diagonally up and to the left on the display.

2. The image displaying apparatus according to claim 1, wherein
    the scroll determining unit is further configured to determine whether or not to scroll the partial image displayed on the display upward or downward according to change in the position detected by the position detector, and
    the positional image determining unit is further configured to determine that the positional image is to be displayed on the right edge of the display in the case where the position detected by the position detector is in a region to the left of a predetermined virtual line that divides the display into left and right sides, and to determine that the positional image is to be displayed on the left edge of the display in the case where the position detected by the position detector is in a region to the right of the predetermined virtual line.

3. The image displaying apparatus according to claim 1, wherein
    the scroll determining unit is further configured to determine whether or not to scroll the partial image displayed on the display upward or downward according to change in the position detected by the position detector, and
    the positional image determining unit is further configured to change the position where the positional image is displayed on the display when the position detected by the position detector moves between a region to the right and a region to the left of a predetermined virtual line that divides the display into left and right sides.

4. The image displaying apparatus according to claim 1, wherein
    the positional image determining unit is further configured to determine a display position of the positional image according to a position of a start point and/or a position of an end point from among positions detected by the position detector.

5. The image displaying apparatus according to claim 1, wherein
    the scroll determining unit is further configured to determine whether or not to scroll the partial image displayed on the display leftward or rightward according to change in the position detected by the position detector, and
    in the case where the scroll determining unit determines to scroll the partial image leftward or rightward, the positional image determining unit determines a position where a positional image is to be displayed on the display according to the position detected by the position detector, the positional image indicating where the partial image being displayed on the display is positioned within the whole image of information content in the left and right directions.

6. An image controlling apparatus comprising:
a position acquiring unit configured to acquire a position where a contacting object contacts a display that displays all or part of information content as a whole image or a partial image in a predetermined area, and when displaying the partial image, to display a positional image indicating where the partial image is positioned within the whole image;
a scroll determining unit configured to determine whether or not to scroll a partial image being displayed on the display according to change in the position acquired by the position acquiring unit in the case where the whole image of the information content does not entirely fit on the display and the partial image is being displayed on the display;
a positional image determining unit configured to determine the position where the positional image is to be displayed on the display according to the position acquired by the position acquiring unit in the case where the scroll determining unit has determined to scroll the partial image, determine that the positional image is to be displayed on a left edge of the display in the case where the position detected by the position detector moves along a path sloped diagonally up and to the right on the display, and determine that the positional image is to be displayed on a right edge of the display in the case where the position detected by the position detector moves along a path sloped diagonally up and to the left on the display; and
an image display controller configured to display both the partial image of the information content and the positional image on the display.

7. An image forming apparatus comprising:
an image forming unit configured to form an image onto a recording medium;
an image display configured to display information regarding the apparatus; and
a controller configured to determine an image to be displayed by the image display, and control display of the determined image;
wherein the image display includes:
a display configured to display all or part of information content as a whole image or a partial image in a predetermined area, and when displaying the partial image, to display a positional image indicating where the partial image is positioned within the whole image; and
a position detector configured to detect a position where a contacting object contacts the display, and
the controller includes:
a scroll determining unit configured to determine whether or not to scroll a partial image being displayed on the display according to change in the position detected by the position detector in the case where the whole image of the information content does not entirely fit on the display and the partial image is being displayed on the display; and
a positional image determining unit configured to determine the position where the positional image is to be displayed on the display according to the position detected by the position detector in the case where the scroll determining unit has determined to scroll the partial image, determine that the positional image is to be displayed on a left edge of the display in the case where the position detected by the position detector moves along a path sloped diagonally up and to the right on the display, and determine that the positional image is to be displayed on a right edge of the display in the case where the position detected by the position detector moves along a path sloped diagonally up and to the left on the display.

8. An image controlling method comprising:
acquiring a position where a contacting object contacts a display that displays all or part of information content as a whole image or a partial image in a predetermined area, and when displaying the partial image, additionally displays a positional image indicating where the partial image is positioned within the whole image;
determining whether or not to scroll a partial image being displayed on the display according to change in the acquired position in the case where the whole image of the information content does not entirely fit on the display and the partial image is being displayed on the display;
determining a position where the positional image is to be displayed on the display according to the acquired position in the case where it is determined to scroll the partial image;
determining that the positional image is to be displayed on a left edge of the display in the case where the position detected by the position detector moves along a path sloped diagonally up and to the right on the display;
determining that the positional image is to be displayed on a right edge of the display in the case where the position detected by the position detector moves along a path sloped diagonally up and to the left on the display; and
displaying both the partial image of the information and the positional image on the display.

9. A non-transitory computer-readable medium storing a program causing a computer to execute a process for displaying an image, the process comprising:
acquiring a position where a contacting object contacts a display that displays all or part of information content as a whole image or a partial image in a predetermined area, and when displaying the partial image, additionally displays a positional image indicating where the partial image is positioned within the whole image;
determining whether or not to scroll a partial image being displayed on the display according to change in the acquired position in the case where the whole image of the information does not entirely fit on the display and the partial image is being displayed on the display;
determining a position where the positional image is to be displayed on the display according to the acquired position in the case where it is determined to scroll the partial image;
determining that the positional image is to be displayed on a left edge of the display in the case where the position detected by the position detector moves along a path sloped diagonally up and to the right on the display;
determining that the positional image is to be displayed on a right edge of the display in the case where the position detected by the position detector moves along a path sloped diagonally up and to the left on the display; and displaying both the partial image of the information and the positional image on the display.

* * * * *